US012675364B2

(12) United States Patent
Burich et al.

(10) Patent No.: US 12,675,364 B2
(45) Date of Patent: Jul. 7, 2026

(54) PAGE-BY-PAGE LEVEL SHAPING

(71) Applicant: Micron Technology, Inc., Boise, ID (US)

(72) Inventors: Mariano Eduardo Burich, San Diego, CA (US); Sivagnanam Parthasarathy, Carlsbad, CA (US); Phong Sy Nguyen, Livermore, CA (US); Yoav Weinberg, Toronto (CA)

(73) Assignee: Micron Technology, Inc., Boise, ID (US)

( * ) Notice: Subject to any disclaimer, the term of this patent is extended or adjusted under 35 U.S.C. 154(b) by 64 days.

(21) Appl. No.: 18/774,464

(22) Filed: Jul. 16, 2024

(65) Prior Publication Data

US 2025/0123925 A1     Apr. 17, 2025

Related U.S. Application Data

(60) Provisional application No. 63/590,312, filed on Oct. 13, 2023.

(51) Int. Cl.
G06F 11/10          (2006.01)

(52) U.S. Cl.
CPC ...... G06F 11/1068 (2013.01); G06F 11/1048 (2013.01)

(58) Field of Classification Search
None
See application file for complete search history.

(56) References Cited

U.S. PATENT DOCUMENTS

| | | | |
|---|---|---|---|
| 2011/0138105 A1 | 6/2011 | Franceschini et al. | |
| 2011/0276749 A1 | 11/2011 | Litsyn et al. | |
| 2012/0166717 A1* | 6/2012 | Lin ................... | G11C 16/3418 |
| | | | 711/E12.008 |
| 2013/0024746 A1* | 1/2013 | Sharon ............... | G06F 11/1044 |
| | | | 714/766 |
| 2013/0103891 A1 | 4/2013 | Sharon et al. | |
| 2013/0191579 A1 | 7/2013 | Sharon et al. | |

(Continued)

OTHER PUBLICATIONS

D. K.-H. Yu and J.-W. Hsieh, "Differential Evolution Algorithm With Asymmetric Coding for Solving the Reliability Problem of 3D-TLC CT Flash-Memory Storage Systems," in IEEE Transactions on Computer-Aided Design of Integrated Circuits and Systems, vol. 41, No. 9, pp. 2863-2876, Sep. 2022, (Year: 2022).*

(Continued)

*Primary Examiner* — Daniel F. McMahon
(74) *Attorney, Agent, or Firm* — Holland & Hart LLP

(57) ABSTRACT

Methods, systems, and devices for page-by-page level shaping are described. The described techniques provide for a controller of a memory device to implement page-by-page level shaping when transferring data to a non-volatile memory device (e.g., flash memory). For example, the controller receives a first set of bits associated with a first page of memory cells and shapes the first set of bits using a first shaping function to generate a second set of bits. Additionally, the controller receives a third set of bits associated with a second page of memory cells and shapes the third set of bits using a second shaping function and the second set of bits to generate a fourth set of bits. In some cases, the controller shapes successive sets of bits using previously shaped bits and respective shaping functions.

25 Claims, 6 Drawing Sheets

00

(56) References Cited

U.S. PATENT DOCUMENTS

| | | | |
|---|---|---|---|
| 2014/0157086 A1 | 6/2014 | Sharon et al. | |
| 2016/0163382 A1* | 6/2016 | Conley | G11C 16/3459 |
| | | | 365/185.03 |
| 2016/0232983 A1* | 8/2016 | Khurana | G11C 11/56 |

OTHER PUBLICATIONS

"International Search Report and Written Opinion of the International Searching Authority," issued in connection with Int'l Appl. No. PCT/US2024/038358, dated Oct. 30, 2024 (9 pages).

* cited by examiner

FIG. 4

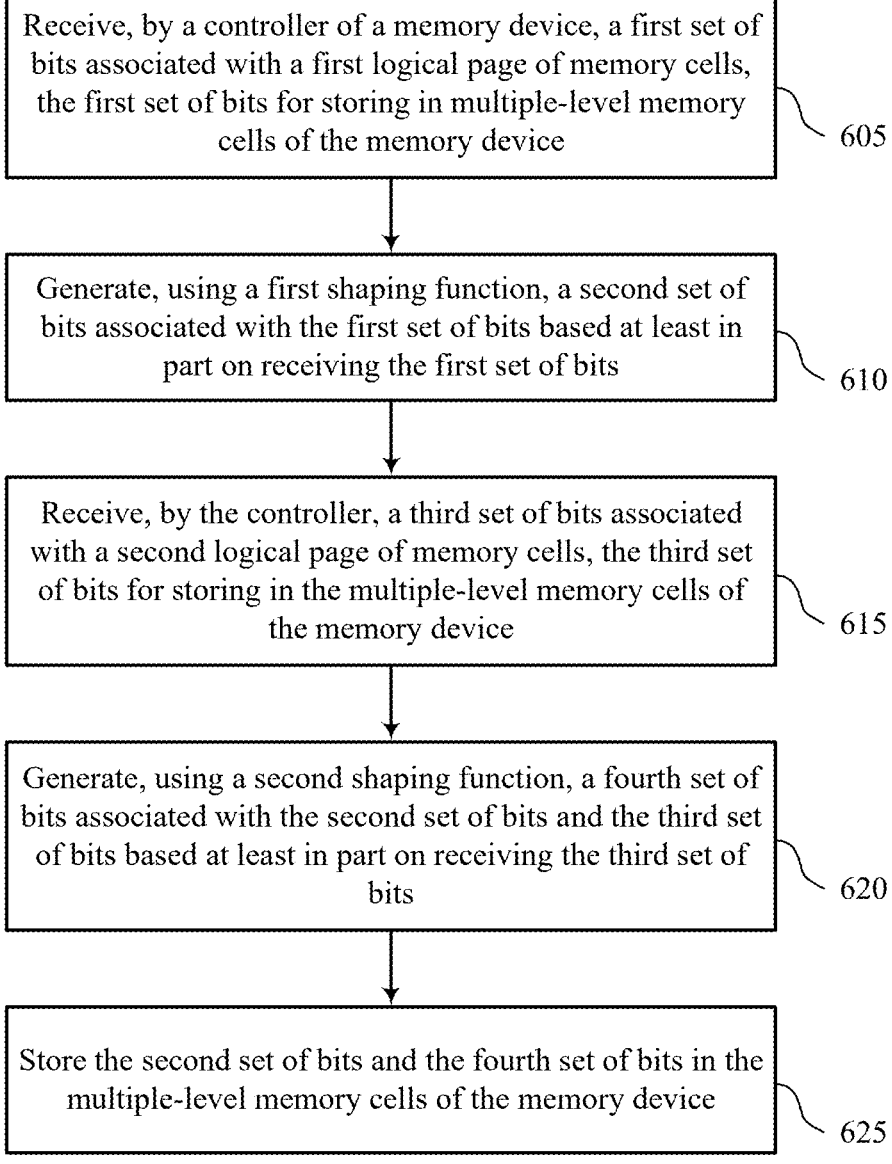

Receive, by a controller of a memory device, a first set of bits associated with a first logical page of memory cells, the first set of bits for storing in multiple-level memory cells of the memory device

605

Generate, using a first shaping function, a second set of bits associated with the first set of bits based at least in part on receiving the first set of bits

610

Receive, by the controller, a third set of bits associated with a second logical page of memory cells, the third set of bits for storing in the multiple-level memory cells of the memory device

615

Generate, using a second shaping function, a fourth set of bits associated with the second set of bits and the third set of bits based at least in part on receiving the third set of bits

620

Store the second set of bits and the fourth set of bits in the multiple-level memory cells of the memory device

PAGE-BY-PAGE LEVEL SHAPING

CROSS REFERENCE

The present application for patent claims priority to U.S. Patent Application No. 63/590,312 by Burich et al., entitled "PAGE-BY-PAGE LEVEL SHAPING," filed Oct. 13, 2023, which is assigned to the assignee hereof, and which is expressly incorporated by reference in its entirety herein.

TECHNICAL FIELD

The following relates to one or more systems for memory, including page-by-page level shaping.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 4 shows an example of a process flow that supports page-by-page level shaping in accordance with examples as disclosed herein.

FIG. 6 shows a flowchart illustrating a method or methods that support page-by-page level shaping in accordance with examples as disclosed herein.

DETAILED DESCRIPTION

Figure 1:
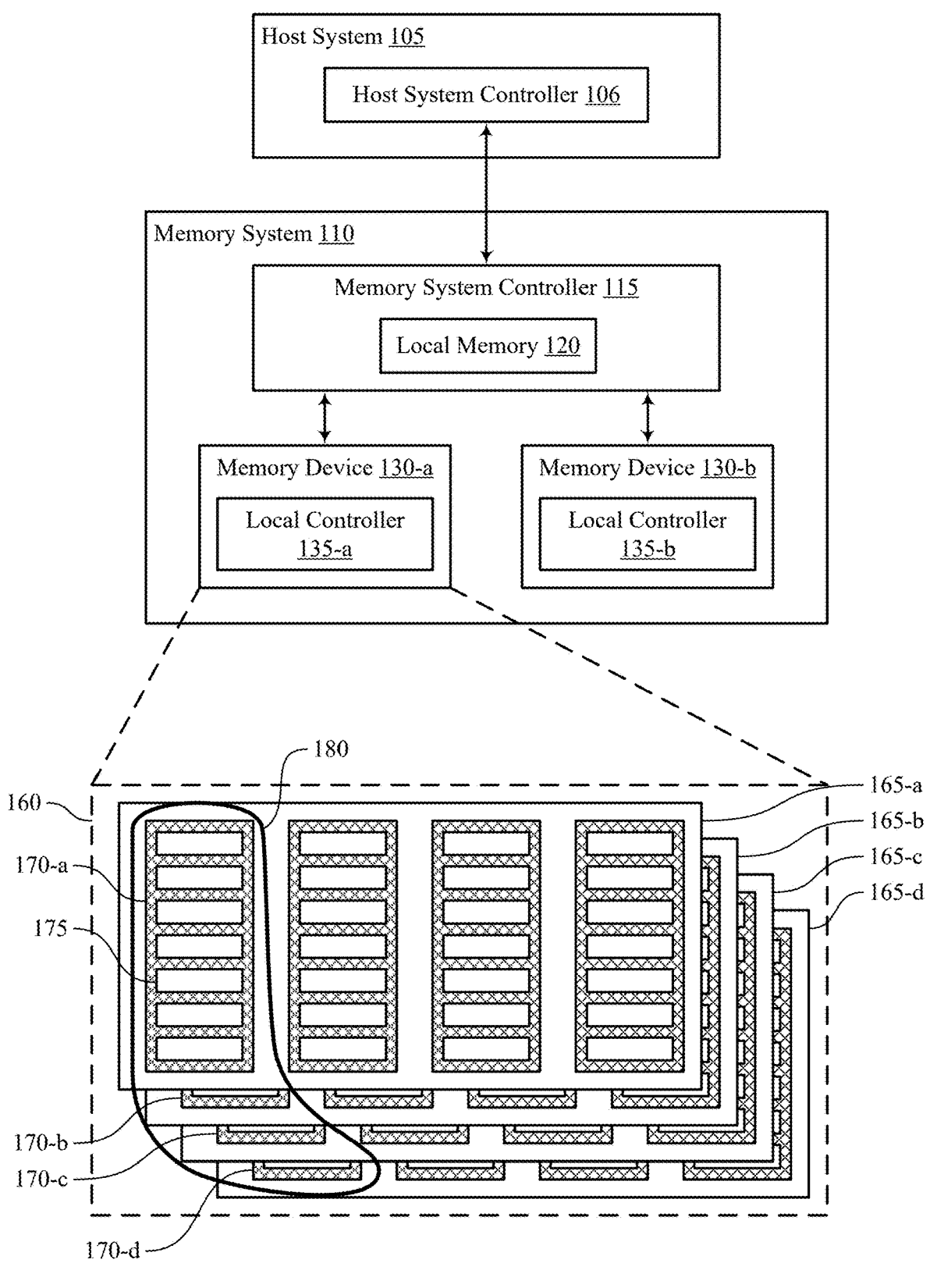
FIG. 1 shows an example of a system that supports page-by-page level shaping in accordance with examples as disclosed herein.

Memory devices as described herein may support storing data in memory cells configured to store multiple bits of information. In some cases, such memory cells may be referred to as multiple-level memory cells and may store respective bits in one or more pages. For example, a controller of a memory device may receive respective sets of bits corresponding to different logical pages (e.g., a lower page (LP), an upper page (UP), an extra page (XP), a top page (TP)) to store in a set of multiple-level memory cells of the memory device. Additionally, the controller may shape the received bits such that the logic states stored in the multiple-level memory cells follow a non-uniform distribution (e.g., if a uniform level distribution is suboptimal).

For example, the controller may implement a data modulation scheme that provides a different shape to a probability mass function of the levels (e.g., logic states, bit sequences) written to the multiple-level memory cells. In such examples, the controller may apply a level shaping function to a sequence of bits (e.g., to be stored in a multiple-level memory cell) once a bit from each page is available at a level shaping module. However, waiting for bits from each page to be ready before shaping and writing the bits to the memory device may incur significant bandwidth costs within paths of the memory device (e.g., electrical connections within a solid-state drive (SSD) controller, an open not-and (NAND) flash interface (ONFI) bus, or both), which may limit a throughput of the memory device when transferring data to flash memory.

In accordance with examples described herein, a controller of a memory device may implement page-by-page level shaping to reduce bandwidth costs associated with level shaping multiple bits from different pages when transferring data to flash memory (e.g., NAND memory). For example, the controller may receive a first set of bits associated with a first page of memory cells (e.g., LP bits), and shape the first set of bits using a first shaping function to generate a second set of bits that are shaped according to a non-uniform distribution. The controller may send the second set of bits to the flash memory at a first time (e.g., during a first duration). Additionally, the controller may receive a third set of bits associated with a second page of memory cells (e.g., UP bits), and may shape the third set of bits using a second shaping function and the second set of bits (e.g., using previously shaped bits as an input to the shaping function) to generate a fourth set of bits that are shaped according to the non-uniform distribution. The controller may send the fourth set of bits to the flash memory at a second time (e.g., during a second duration) that is after the first time. In some cases, the controller may continue to shape successive sets of bits (e.g., XP bits, TP bits) using previously shaped bits. By leveraging previously shaped bits as inputs to a subsequent shaping function and staggering the transmission of the shaped bits to the flash memory, bandwidth costs associated with transferring the shaped bits may be reduced and the overall throughput of the memory device may be improved.

Features of the disclosure are illustrated and described in the context of systems, devices, and circuits. Features of the disclosure are further illustrated and described in the context of a shaping scheme, a process flow, and a flowchart.

FIG. 1 shows an example of a system 100 that supports page-by-page level shaping in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support page-by-page level shaping. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, the memory system 110 may implement page-by-page level shaping techniques to reduce a bandwidth cost associated with transferring multiple shaped bits to flash memory (e.g., a NAND memory cell array located at a memory device 130). In some examples, the memory system controller 115 may receive respective sets of bits associated with multiple different pages of memory cells from the host system 105 (e.g., bits from a LP, an UP, an XP, and a TP) to be stored in one or more multiple-level memory cells of a memory device 130. In some cases, the memory system controller 115 may apply a level shaping function to the received bits in order to adjust a probability mass function of levels associated with the multiple-level memory cells (e.g., logic states, bit sequences) into a non-uniform distribution.

The memory system controller 115 may apply page-by-page level shaping function such that transmissions of shaped bits to the memory device 130 are staggered (e.g., per page) and previously shaped bits are included as an input to subsequent bit shaping functions. For example, the memory system controller 115 may us a first shaping function to shape a bit associated with a first page (e.g., LP), and may send the shaped bit to the memory device 130, and may use the shaped bit to inform a second shaping function when shaping a bit associated with a second page (e.g., UP). By leveraging previously shaped bits as inputs to a subsequent shaping function and staggering the transmission of the shaped bits to the memory device 130, bandwidth costs associated with transferring the shaped bits may be reduced and the overall throughput of the memory device 130 may be improved.

In addition to applicability in memory systems as described herein, techniques for page-by-page level shaping may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by reducing bandwidth costs associated with transferring bits associated with multiple pages of memory cells to a NAND memory array, which may decrease processing or latency times associated with folding data, among other benefits.

In addition to applicability in memory systems as described herein, techniques for page-by-page level shaping may be generally implemented to support edge computing applications. Edge computing is a distributed computing paradigm that brings computation and data storage closer to the sources of data than traditional cloud services. As the use of edge computing to provide computing, storage, and networking services at locations that are geographically closer to end users increases, many devices and systems may benefit from improved processing, performance, and storage at edge devices. For example, increasing memory density, capacity, and processing power of edge devices may decrease a reliance on the devices to remote computing or devices, which may otherwise increase latency of operations performed at the devices. Implementing the techniques described herein may support edge computing techniques by improving response times associated with edge computing devices, among other benefits.

Figure 2:
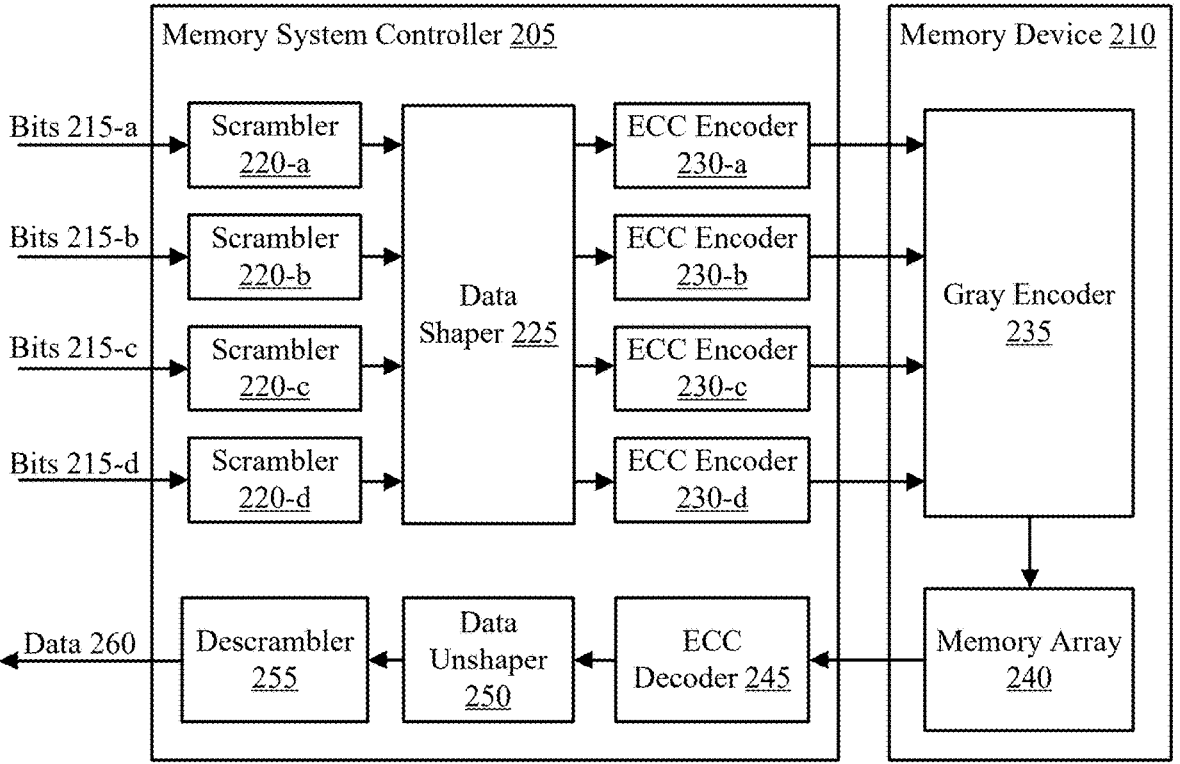
FIG. 2 shows an example of a memory system that supports page-by-page level shaping in accordance with examples as disclosed herein.

FIG. 2 shows an example of a memory system 200 that supports page-by-page level shaping in accordance with examples as disclosed herein. The memory system 200 may be an example of a system 100 described with reference to FIG. 1 or aspects thereof. For example, the memory system 200 may be an example of a memory system 110 that includes a memory system controller 205 and a memory device 210, which may be examples of corresponding devices described with reference to FIG. 1. In some cases, the memory system 200 may support the memory system controller 205 receiving one or more bits 215 from a host system (e.g., a host system 105 described with reference to FIG. 1) to be stored in a memory array 240 of the memory device 210. For example, the memory system controller 205 may be configured to store a respective bit from multiple different logical pages in a multiple-level memory cell (e.g., a MLC, a TLC, a QLC, or the like).

The memory system controller 205 may be configured to receive multiple bits 215 from a host system corresponding to different pages of memory cells. For example, the memory system controller 205 may receive a first set of bits 215-a associated with a first page of memory cells (e.g., host data from LP, $U_{LP}$), a second set of bits 215-b associated with a second page of memory cells (e.g., host data from UP, $U_{UP}$), a third set of bits 215-c associated with a third page of memory cells (e.g., host data from XP, $U_{XP}$), a fourth set of bits 215-d associated with a fourth page of memory cells (e.g., host data from TP, $U_{TP}$), or any combination thereof. Each of the set of bits 215 may represent any quantity of bits associated with a respective page that are received by the memory system controller 205. For example, the first set of bits 215-a may represent a set of N bits associated with the first page of memory cells (e.g., $U_{LP} \in \{0,1\}^N$), where N may represent a quantity of memory cells associated with a wordline of the memory array 240.

Additionally, or alternatively, the memory system controller 205 may scramble each set of bits 215 via a respective scrambler 220, which may include performing a binary addition between each data bit (e.g., each host data bit) and a pseudo-random sequence. For example, the memory system controller may scramble the first set of bits 215-a using a scrambler 220-a (e.g., generating scrambled data $Q_{LP}$), may scramble the second set of bits 215-b using a scrambler 220-b (e.g., generating scrambled data $Q_{UP}$), may scramble the third set of bits 215-c using a scrambler 220-c (e.g., generating scrambled data $Q_{XP}$), and may scramble the fourth set of bits 215-d using a scrambler 220-d (e.g., generating scrambled data $Q_{TP}$).

In some cases, the memory system controller 205 may input the scrambled bits 215 to a data shaper 225. The data shaper 225 may implement a data modulation scheme that provides a different shape to a probability mass function associated with levels written to the memory device 210. If the host data is transferred without performing such data modulation, each level associated with a multiple-level memory cell (e.g., a logic state or sequence of bits stored in the memory cell) may follow a uniform distribution. For example, for data storage in a QLC, each level may be associated with an occurrence probability of 1/16. As another example, for data storage in a TLC, each level may be associated with an occurrence probability of 1/8. However, such uniform level distributions may be suboptimal (e.g., for non-volatile memory), such as when intrinsic imperfections present in the memory device 210 are independent from the host data (e.g., if a certain level is intrinsically less reliable). Accordingly, the data shaper 225 may modulate the scrambled bits 215 to follow a non-uniform level distribution. For example, after being shaped by the data shaper 225, a first level of a multiple-level memory cell (e.g., $L_0=1111$ for QLC storage) may be less likely to occur relative to a second level of the multiple-level memory cell (e.g., $L_2=1010$ for QLC storage).

After shaping the bits 215 using the data shaper 225, the memory system controller 205 may input the shaped bits 215 to respective error correction control (ECC) encoders 230 to encode the data before transferring the data to the memory device 210. For example, the memory system controller 205 may encode the shaped bits 215-a using an ECC encoder 230-a (e.g., generating encoded shaped data $M_{LP}$), may encode the shaped bits 215-b using an ECC encoder 230-b (e.g., generating encoded shaped data $M_{UP}$), may encode the shaped bits 215-c using an ECC encoder 230-c (e.g., generating encoded shaped data $M_{XP}$), and may encode the shaped bits 215-d using an ECC encoder 230-d (e.g., generating encoded shaped data $M_{TP}$). In some cases, the memory system controller 205 may send the encoded shaped bits 215 to the memory device 210.

The memory device 210 may be configured to receive the shaped bits 215 (e.g., $M_{LP}$, $M_{UP}$, $M_{XP}$, and $M_{TP}$) from the memory system controller 205 and may encode the bits 215 using a gray encoder 235. In some examples, the gray encoder 235 may encode the received bits 215 into levels of a multiple-level memory cell, L. For example, the gray encoder 235 may output M bit sequences to be stored in respective multiple-level memory cells of the memory array 240 (e.g., $L \in \{0, \ldots, 15\}^M$), where M may be equal to N (e.g., the quantity of memory cells associated with a wordline of the memory array 240) or may be equal to N+O, where O may represent a quantity of shaping overhead bits associated with the data shaper 225. In such examples, each level L may include a respective bit 215 from each logical page of the host system (e.g., one QLC may store one bit from each of the LP, the UP, the XP, and the TP). The memory device 210 may then store the bit sequences in the multiple-level memory cells of the memory array 240.

To access one or more bits stored in the memory array 240 (e.g., when requested by the host system), the memory system controller 205 may be configured to receive the one or more bits from the memory device 210 and may decode the one or more bits. For example, the memory system controller 205 may receive shaped data $\widehat{M_p}$ (e.g., a relatively noisy version of shaped data for a given page p) from the memory array 240, may decode the shaped data using an ECC decoder 245, may unshape the data using a data unshaper 250, may descramble the data using a descrambler 255, and may transmit data 260 to the host system (e.g., $\widehat{U_p}$, which may be a relatively noisy version of the originally transmitted data for a given page p).

In some cases, when shaping data using the data shaper 225, the memory system controller 205 may refrain from performing the data modulation until data from each logical page is available at the data shaper 225. For example, the memory system controller 205 may wait until each of the bits 215-a, the bits 215-b, the bits 215-c, and the bits 215-d have been scrambled (e.g., $Q_{LP}$, $Q_{UP}$, $Q_{XP}$, and $Q_{TP}$ are ready at the data shaper 225) before modulating the data. For example, the memory system controller 205 may modulate the data according to a shaping function defined by Equation 1 below.

$$\widehat{f_{LP}}, \widehat{f_{UP}}, \widehat{f_{XP}}, \widehat{f_{TP}} = \text{argmin} \hspace{2cm} \text{Equation 1}$$

$$< H([W_{LP} + f_{LP}, W_{UP} + f_{UP}, W_{XP} + f_{XP}, W_{TP} + f_{TP}]), C >$$

With reference to Equation 1, each scrambled page, $Q_p$, may be divided into windows of size L, which are represented in Equation 1 as $W_p$ (e.g., $W \in \{0,1\}^L$), such that data modulation is performed for each window according to a respective flipping flag f (e.g., the memory system controller 205 numerically searches for a solution to Equation 1 in real-time). In some cases, the operator '<x, y>' may define an inner product between vectors x and y and the operator '+' may be a modulus-2 sum. Further, the function H may build a vector associated with the levels of a multiple-level memory cells where each entry of the vector may represent a cardinality of each level (e.g., building a level histogram). As an example, for QLC storage, the function H may build a 16-element vector according to H: $\{0,1\}^{4*L} \rightarrow \mathbb{N}^{16}$ that computes the cardinality of QLC levels (e.g., 0000, 0001, . . . , 1111) represented in decimal order. It should be noted that, for simplicity and without loss of generality, in this notation, H may not follow the gray code applied by the gray encoder 235. Additionally, C may represent a cost vector (e.g., a predefined cost vector) including elements defining a target distribution (e.g., 16 elements for QLC, 8 elements for TLC, and so on).

As shown by Equation 1, the memory system controller 205 may be unable to complete data modulation using the data shaper 225 until each set of bits 215 is received and scrambled by the memory system controller 205. For example, even if the set of bits 215-a are ready to be modulated by the data shaper 225, the memory system controller 205 may wait to modulate the set of bits 215-a if any of the set of bits 215-b, the set of bits 215-c, or the set of bits 215-d are not yet available at the data shaper 225. However, waiting until each set of bits 215 are available at the data shaper 225 to perform data modulation may incur relatively high bandwidth costs in one or more paths (e.g., electrical connections) within the memory system 200, such as within an SSD controller, an ONFI bus, or the like.

To mitigate bandwidth costs associated with modulating data from multiple different logical pages, the memory system controller 205 may implement page-by-page level shaping, as described in further detail below with reference to FIG. 3. For example, the memory system controller 205 may implement a respective shaping function for each set of bits 215 such that data associated with a page may be modulated when the set of bits 215 are available at (e.g., received by) the data shaper 225.

As an example, when the set of bits 215-a are received by the data shaper 225, the memory system controller 205 may shape the set of bits 215-a using a first shaping function and may transfer the shaped set of bits 215-a to the memory device 210 (e.g., despite the set of bits 215-b, the set of bits 215-c, or the set of bits 215-d being not yet available at the data shaper 225). As such, the memory system controller 205 may stagger transferring shaped data on a page-by-page basis, which may reduce or otherwise mitigate the bandwidth costs associated with shaping the data. Additionally, the memory system controller 205 may use previously shaped bits to inform subsequent shaping functions (e.g., the shaped set of bits 215-a may be used to inform a shaping function for the set of bits 215-b). By leveraging previously shaped bits as inputs to a subsequent shaping function and staggering the transmission of the shaped bits to the memory device, bandwidth costs associated with transferring the shaped bits may be reduced and the overall throughput of the memory device 210 may be improved.

Figure 3:
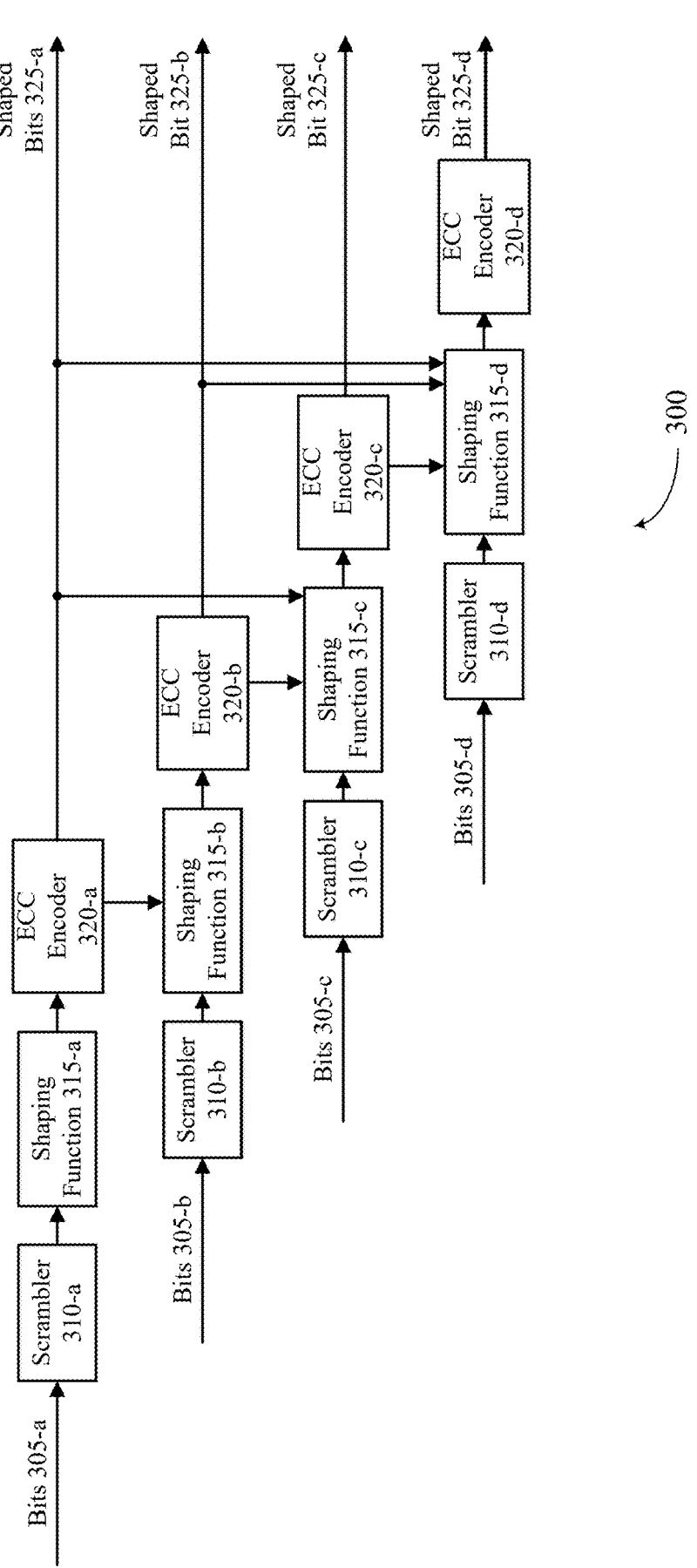
FIG. 3 shows an example of a shaping scheme that supports page-by-page level shaping in accordance with examples as disclosed herein.

FIG. 3 shows an example of a shaping scheme 300 that supports page-by-page level shaping in accordance with examples as disclosed herein. The shaping scheme 300 may implement, or be implemented by, one or more aspects of the system 100 and the memory system 200. For example, the shaping scheme 300 may illustrate components that support page-by-page level shaping within a memory system controller, which may be an example of a corresponding device described with reference to FIGS. 1 and 2.

As described herein, the memory system controller may receive one or more sets of bits 305 (e.g., from a host system) to be stored in one or more multiple-level memory cells of a memory device coupled with the memory system controller. In some cases, different sets of bits 305 may correspond to different logical pages. For example, the memory system controller may receive a set of bits 305-a associated with a first logical page of memory cells (e.g., an LP), a set of bits 305-b associated with a second logical page of memory cells (e.g., a UP), a set of bits 305-c associated with a third logical page of memory cells (e.g., an XP), a set of bits 305-d associated with a fourth logical page of memory cells (e.g., a TP), or any combination thereof. Additionally, the memory system controller may scramble each set of bits 305 via a respective scrambler 310, which may include performing a binary addition between each host data bit and a pseudo-random sequence. For example, the memory system controller may scramble the set of bits 305-a using a scrambler 310-a, may scramble the set of bits 305-b using a scrambler 310-b, may scramble the set of bits 305-c using a scrambler 310-c, and may scramble the set of bits 305-d using a scrambler 310-d.

In some cases, the memory system controller may implement a respective shaping function 315 to modulate each received set of bits 305. For example, to mitigate bandwidth costs associated with waiting for each set of bits 305 to be available at a data shaping component (e.g., the data shaper 225 described with reference to FIG. 2), the memory system controller may modulate each received set of bits 305 on a page-by-page basis. In such examples, the memory system controller may apply a shaping function 315 when a corresponding set of bits are ready to be modulated. For example, if the memory system controller receives and scrambles the set of bits 305-a first (e.g., before the set of bits 305-b, the set of bits 305-c, and the set of bits 305-d are ready), the memory system controller may apply a shaping function 315-a to the set of bits 305-a. In some cases, the shaping function 315-a may be defined according to Equation 2 below.

$$f_{LP}^{\rightarrow} = \text{argmin} < H([W_{LP} + f_{LP}]), C_{LP} > \qquad \text{Equation 2}$$

As shown in Equation 2, the memory system controller may be configured to shape the set of bits 305-a despite the set of bits 305-b, the set of bits 305-c, and the set of bits 305-d not yet being available for modulation. Further, the memory system controller may calculate the flipping flag $f_{LP}$ (e.g., in a "greedy manner," due to the flag depending only on previous data). In some cases, the memory system controller may input a result of the shaping function 315-a to an ECC encoder 320-a to generate a set of shaped bits 325-a, and may send the set of shaped bits 325-a to the memory device at a first time (e.g., sent to flash memory at $T=t_0$).

Additionally, the memory system controller may maintain a copy of the set of shaped bits 325-a to support shaping one or more subsequent sets of bits 305. For example, the memory system controller may receive and scramble the set of bits 305-b (e.g., after generating the set of shaped bits 325-*a*), and may apply a shaping function 315-*b* to the set of bits 305-*b*. In some cases, the shaping function 315-*b* may be defined according to Equation 3 below.

$$\widetilde{f_{UP}} = \text{argmin} < H([W_{LP} + \widetilde{f_{LP}}, W_{UP} + f_{UP}]), C_{UP} > \quad \text{Equation 3}$$

As shown in Equation 3, the memory system controller may be configured to shape the set of bits 305-*b* using both the set of bits 305-*b* and the shaped set of bits 325-*a* as inputs to the shaping function 315-*b*. Further, the memory system controller may calculate the flipping flag $f_{UP}$. In some cases, by including the shaped set of bits 325-*a* as an input to the shaping function 315-*b*, an output of the shaping function 315-*b* may be improved (e.g., a better decision may be made by leveraging previously shaped data, which may mitigate a loss of optimality associated with page-by-page level shaping). In some cases, the memory system controller may input a result of the shaping function 315-*b* to an ECC encoder 320-*b* to generate a set of shaped bits 325-*b*, and may send the set of shaped bits 325-*b* to the memory device at a second time subsequent to the first time (e.g., sent to flash memory at T=t₁).

Additionally, the memory system controller may maintain a copy of the set of shaped bits 325-*b* to support shaping one or more subsequent sets of bits 305. For example, the memory system controller may receive and scramble the set of bits 305-*c* (e.g., after generating the set of shaped bits 325-*a* and the set of shaped bits 325-*b*), and may apply a shaping function 315-*c* to the set of bits 305-*c*. In some cases, the shaping function 315-*c* may be defined according to Equation 4 below.

$$\widetilde{f_{XP}} = \text{argmin} < H([W_{LP} + \widetilde{f_{LP}}, W_{UP} + \widetilde{f_{UP}}, W_{XP} + f_{XP}]), C_{XP} > \quad \text{Equation 4}$$

As shown in Equation 4, the memory system controller may be configured to shape the set of bits 305-*c* using the set of bits 305-*c* as well as the shaped set of bits 325-*a*, the shaped set of bits 325-*b*, or both as inputs to the shaping function 315-*c*. Further, the memory system controller may calculate the flipping flag $f_{XP}$. In some cases, by including the shaped set of bits 325-*a*, the shaped set of bits 325-*b*, or both as inputs to the shaping function 315-*c*, an output of the shaping function 315-*c* may be improved (e.g., a better decision may be made by leveraging previously shaped data, which may mitigate a loss of optimality associated with page-by-page level shaping). In some cases, the memory system controller may input a result of the shaping function 315-*c* to an ECC encoder 320-*c* to generate a set of shaped bits 325-*c*, and may send the set of shaped bits 325-*c* to the memory device at a third time subsequent to the first time and the second time (e.g., sent to flash memory at T=t₂).

Additionally, the memory system controller may maintain a copy of the set of shaped bits 325-*c* to support shaping one or more subsequent sets of bits 305. For example, the memory system controller may receive and scramble the set of bits 305-*d* (e.g., after generating the set of shaped bits 325-*a*, the set of shaped bits 325-*b*, and the set of shaped bits 325-*c*), and may apply a shaping function 315-*d* to the set of bits 305-*d*. In some cases, the shaping function 315-*d* may be defined according to Equation 5 below.

$$\widetilde{f_{TP}} = \text{argmin}$$
$$< H([W_{LP} + \widetilde{f_{LP}}, W_{UP} + \widetilde{f_{UP}}, W_{XP} + \widetilde{f_{XP}}, W_{TP} + f_{TP}]), C_{TP} > \quad \text{Equation 5}$$

As shown in Equation 5, the memory system controller may be configured to shape the set of bits 305-*d* using the set of bits 305-*d* as well as the shaped set of bits 325-*a*, the shaped set of bits 325-*b*, the shaped set of bits 325-*c*, or any combination thereof as inputs to the shaping function 315-*c*. Further, the memory system controller may calculate the flipping flag $f_{TP}$. In some cases, by including the shaped set of bits 325-*a*, the shaped set of bits 325-*b*, the shaped set of bits 325-*c*, or any combination thereof as inputs to the shaping function 315-*d*, an output of the shaping function 315-*d* may be improved (e.g., a better decision may be made by leveraging previously shaped data, which may mitigate a loss of optimality associated with page-by-page level shaping). In some cases, the memory system controller may input a result of the shaping function 315-*d* to an ECC encoder 320-*d* to generate a set of shaped bits 325-*d*, and may send the set of shaped bits 325-*d* to the memory device at a fourth time subsequent to the first time, the second time, and the third time (e.g., sent to flash memory at T=t₃).

In some cases, the memory system controller may compute a cost (e.g., $\widetilde{f_{LP}}$, $\widetilde{f_{UP}}$, $\widetilde{f_{XP}}$, and $\widetilde{f_{TP}}$) as part of a shaping function 315. For example, the memory system controller may compute an inner product between a level histogram (e.g., H) and a cost vector for the shaping function (e.g., $C_{LP}$, $C_{UP}$, $C_{XP}$, and $C_{TP}$). For example, when determining the set of shaped bits 325-*b* (e.g., bits associated with UP), the memory system controller may compute a first histogram for the case where UP is not flipped (e.g., $f_{UP}=0$) and may calculate a first inner product (e.g., X) of the first histogram and the associated cost vector (e.g., $C_{UP}$). Further, the memory system controller may compute a second histogram for the case where UP is flipped (e.g., $f_{UP}=1$) and may calculate a second inner product (e.g., Y) of the second histogram and the associated cost vector. In some cases, the memory system controller may identify a state of $f_{UP}$ according to a minimum value between the first inner product and the second inner product (e.g., if X<Y, use $f_{UP}=0$, otherwise, use $f_{UP}=1$).

In such examples, the first histogram and the second histogram may be separately computed (e.g., the second histogram is completely recomputed) to calculate the first inner product and the second inner product, respectively. For example, the memory system controller may count the data during each calculation, once when UP is flipped and again when UP is not flipped. However, such recomputing may incur greater resource usage at the memory system controller. To improve an efficiency of computing the cost, the memory system controller may calculate the first histogram, and may reuse a shifted or swapped version of the first histogram to support calculating the second histogram without counting again. Alternatively, the memory system controller may separately compute the first histogram and the second histogram, and may shift or swap one or more positions of the cost vector (e.g., $C_{UP}$) when computing the second inner product. Such techniques may be supported by Equations 6 and 7 below.

$$\widehat{f_{UP}} = \mathrm{argmin}\{ < H([W_{LP} + \widehat{f_{LP}}, W_{UP}]),$$

<div align="right">Equation 6</div>

$$C_{UP} >, \mathrm{swap} \, (<H([W_{LP} + \widehat{f_{LP}}, W_{UP}])), C_{UP} >\}$$

Equation 6 may support the memory system controller accumulating a histogram of the original count (e.g., the first histogram computed without flipping) and obtaining the histogram count of the flipped data (e.g., the second histogram computed with flipping) by swapping the original histogram count.

$$\widehat{f_{UP}} = \mathrm{argmin}\{ < H([W_{LP} + \widehat{f_{LP}}, W_{UP}]),$$

<div align="right">Equation 7</div>

$$C_{UP} >, \, <H([W_{LP} + \widehat{f_{LP}}, W_{UP}]), \mathrm{swap} \, (C_{UP}) >\}$$

Equation 7 may support the memory system controller using the original histogram count and swapping the cost vector (e.g., instead of swapping the first histogram to obtain the second histogram). In some cases, using Equation 7, the memory system controller may obtain the same inner product result as Equation 6.

In some cases, by staggering the transmission of the sets of shaped bits 325 to the memory device and using previously shaped bits to inform subsequent shaping functions 315, bandwidth costs within paths of the memory system controller or the memory device may be reduced (e.g., while maintaining a same buffer size).

It should be noted that the memory system controller may receive any quantity of sets of bits 305 according to a type of multiple-level memory cell that the data is to be stored to. For example, for storage in a wordline of MLCs, the memory system controller may receive two sets of bits 305, for storage in a wordline of TLCs, the memory system controller may receive three sets of bits 305, for storage in a wordline of QLCs, the memory system controller may receive four sets of bits 305, and so on.

Additionally, the memory system controller may support any configuration of inputs to the shaping functions 315. As an example, the memory system controller may only use a most recently generated set of shaped bits 325 as an input to a shaping function 315 according to an ordering of the logical pages. For example, the memory system controller may input only the set of shaped bits 325-a to the shaping function 315-b (e.g., using shaped LP data when shaping UP data), may input only the set of shaped bits 325-b to the shaping function 315-c (e.g., using shaped UP data when shaping XP data), may input only the shaped bits 325-c to the shaping function 315-d (e.g., using shaped XP data when shaping TP data), and so on. As another example, the memory system controller may use only the shaped set of bits 325-a (e.g., the shaped bits generated first) as an input to each subsequent shaping function 315 (e.g., refraining from storing copies of the set of shaped bits 325-b, the set of shaped bits 325-c, or the set of shaped bits 325-d). That is, the memory system controller may include any combination of previously shaped sets of bits 325 as an input to a shaping function 315.

As shown in Equations 2 through 5, each shaping function 315 may be associated with a respective cost vector. In some cases, each respective cost vector may include intermediate costs of a total cost vector C (e.g., C=[$c^o, \ldots, c^{15}$] in decimal notation) by summing elements of the total cost vector. For example, the cost vector $C_{LP}$ for the shaping function 315-a may include intermediate costs $$C_{LP} = \begin{bmatrix} c_{LP}^0, c_{LP}^1 \end{bmatrix}$$

representing decimal 0 and decimal 1, respectively, for LP data. Specifically, the cost vector $C_{LP}$ may be defined as $C_{LP}=[(c^0+c^2+ \ldots +c^{14}), (c^1+c^3+ \ldots +c^{15})]$. As another example, the cost vector $C_{UP}$ for the shaping function 315-a may include intermediate costs $$C_{UP} = \begin{bmatrix} c_{UP}^0, c_{UP}^1, c_{UP}^2, c_{UP}^3 \end{bmatrix}$$

representing decimal 00, 01, 10, and 11 respectively, for LP data and UP data. Specifically, the cost vector $C_{UP}$ may be defined as $C_{UP}=[(c^0+c^4+C^8+c^{12}), (c^1+c^5+c^9+c^{13}), (c^2+c^6+c^{10}+c^{14}), (c^3+c^7+c^{11}+c^{15})]$. Similarly, the cost vector $C_{XP}$ may be defined as $C_{XP}=[(c^0+c^8), (c^1+c^9), (c^2+c^{10}), \ldots, (c^7+c^{15})]$ and the cost vector $C_{TP}$ may be defined as $C_{XP}=[(c^0, \ldots, c^{15})]$. In some cases, due to the cost vectors being represented in a decimal notation, the memory system controller may apply a gray code to adjust the initial cost vector C (e.g., penalizing the correct levels). By leveraging previously shaped bits as inputs to a subsequent shaping function and staggering the transmission of the shaped bits to the memory device, bandwidth costs associated with transferring the shaped bits may be reduced and the overall throughput of the memory device may be improved.

Figure 4:
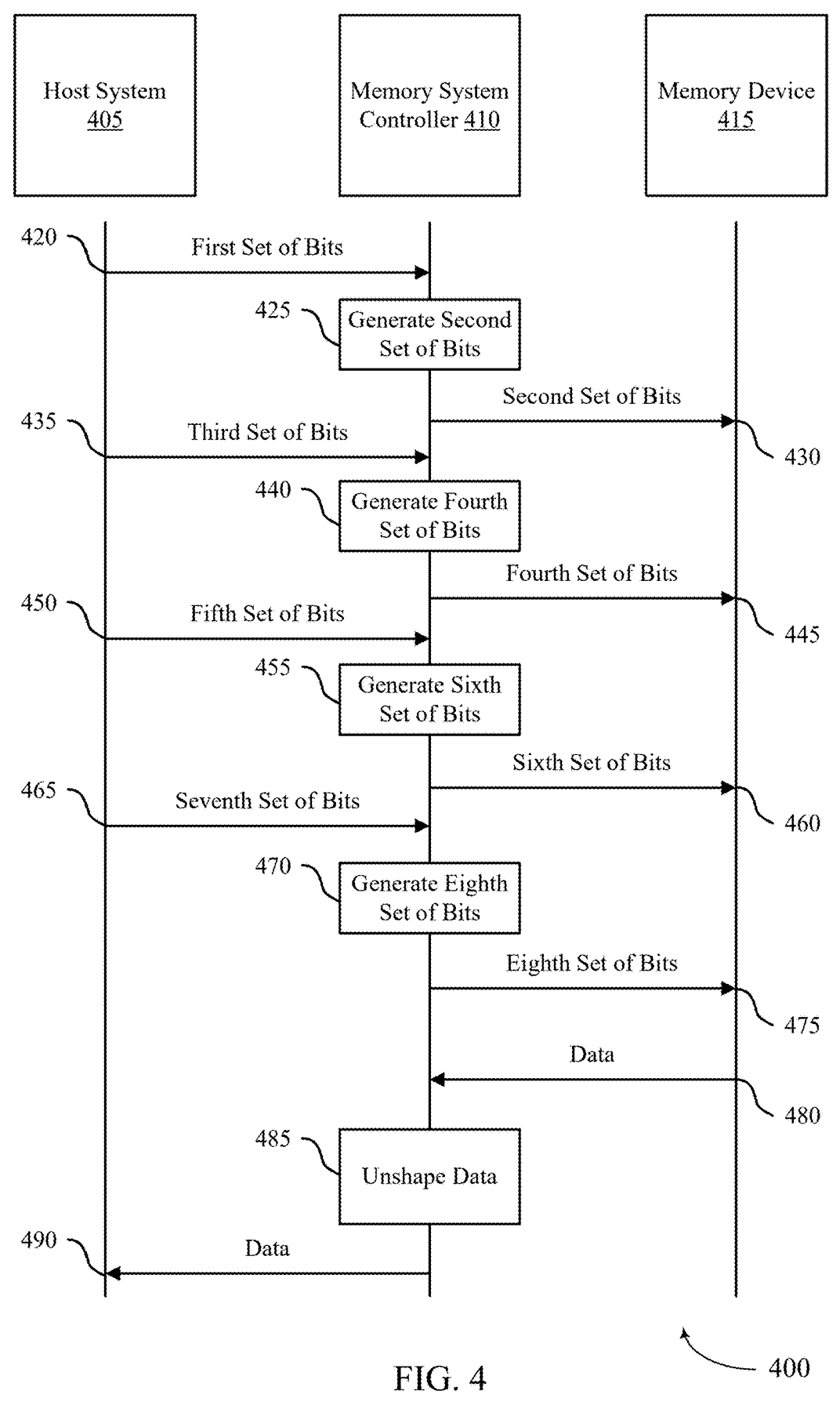

FIG. 4 shows an example of a process flow 400 that supports page-by-page level shaping in accordance with examples as disclosed herein. The process flow 400 may implement, or be implemented by, one or more aspects of the system 100, the memory system 200, and the shaping scheme 300. For example, the process flow 400 shows data transfer between a host system 405, a memory system controller 410, and a memory device 415, which may be examples of corresponding devices described with reference to FIGS. 1 through 3. In some cases, the process flow 400 may support the memory system controller 410 modulating data using page-by-page level shaping techniques described herein. Alternative examples of the following may be implemented, where some processes are performed in a different order than described or are not performed. In some cases, processes may include additional features not mentioned below, or further processes may be added.

At 420, the memory system controller 410 may receive (e.g., from the host system 405), a first set of bits associated with a first logical page of memory cells. The first set of bits may be for storing in one or more multiple-level memory cells of the memory device 415.

At 425, the memory system controller 410 may generate, using a first shaping function, a second set of bits associated with the first set of bits based on receiving the first set of bits. In some cases, the first shaping function may generate the second set of bits based on the first set of bits and a first cost vector associated with the first logical page of memory cells. In some cases, the first cost vector may be calculated based on an inner product between a level histogram and a total cost vector. In some cases, the memory system controller 410 may scramble the first set of bits based on receiving the first set of bits, where the second set of bits may be generated based on the scrambled first set of bits (e.g., the scrambled bits may be input to the first shaping function). For example, the scrambled first set of bits may include bits that are uniformly distributed across one or more logic states and the second set of bits may include bits that are non-uniformly distributed across the one or more logic states based on using the first shaping function. Additionally, or alternatively, the memory system controller 410 may encode the second set of bits (e.g., using an ECC encoder after the first shaping function).

At 430, the memory system controller 410 may store, at a first time, the second set of bits in the multiple-level memory cells based on generating the second set of bits. For example, the memory system controller 410 may store the second set of bits in respective ones of the multiple-level memory cells (e.g., a wordline of the multiple-level memory cells). In some cases, the one or more multiple-level memory cells may include MLCs, TLCs, or QLCs.

At 435, the memory system controller 410 may receive (e.g., from the host system 405), a third set of bits associated with a second logical page of memory cells. The third set of bits may be for storing in the one or more multiple-level memory cells of the memory device 415.

At 440, the memory system controller 410 may generate, using a second shaping function, a fourth set of bits associated with the third set of bits and the second set of bits based on receiving the third set of bits. In some cases, the second shaping function may generate the fourth set of bits based on the second set of bits, a first flipping flag that is output from the first shaping function, the third set of bits, and a second cost vector associated with the second logical page of memory cells. That is, the memory system controller 410 may use the shaped second set of bits as an input to the second shaping function (e.g., which may improve a decision of the second shaping function).

In some cases, the second cost vector may be calculated based on an inner product between a level histogram and a total cost vector. In some cases, the memory system controller 410 may scramble the third set of bits based on receiving the third set of bits, where the fourth set of bits may be generated based on the scrambled third set of bits (e.g., the scrambled bits may be input to the second shaping function). For example, the scrambled third set of bits may include bits that are uniformly distributed across one or more logic states and the fourth set of bits may include bits that are non-uniformly distributed across the one or more logic states based on using the second shaping function. Additionally, or alternatively, the memory system controller 410 may encode the fourth set of bits (e.g., using an ECC encoder after the second shaping function).

At 445, the memory system controller 410 may store, at a second time subsequent to the first time, the fourth set of bits in the multiple-level memory cells based on generating the fourth set of bits. For example, the memory system controller 410 may store the fourth set of bits in respective ones of the multiple-level memory cells (e.g., a wordline of the multiple-level memory cells).

At 450, the memory system controller 410 may receive (e.g., from the host system 405), a fifth set of bits associated with a first logical page of memory cells. The fifth set of bits may be for storing in one or more multiple-level memory cells of the memory device 415.

At 455, the memory system controller 410 may generate, using a third shaping function, a sixth set of bits associated with the fifth set of bits as well as the fourth set of bits, the second set of bits, or both based on receiving the fifth set of bits. In some cases, the third shaping function may generate the sixth set of bits based on the second set of bits, the first flipping flag, a second flipping flag that is output from the second shaping function, the fourth set of bits, the fifth set of bits, and a third cost vector associated with the third logical page of memory cells.

That is, the memory system controller 410 may use the shaped second set of bits, the shaped fourth set of bits, or both as inputs to the third shaping function (e.g., which may improve a decision of the third shaping function). In some cases, the third cost vector may be calculated based on an inner product between a level histogram and a total cost vector. In some cases, the memory system controller 410 may scramble the fifth set of bits based on receiving the fifth set of bits, where the sixth set of bits may be generated based on the scrambled fifth set of bits (e.g., the scrambled bits may be input to the third shaping function). For example, the scrambled fifth set of bits may include bits that are uniformly distributed across the one or more logic states and the sixth set of bits may include bits that are non-uniformly distributed across the one or more logic states based on using the third shaping function. Additionally, or alternatively, the memory system controller 410 may encode the sixth set of bits (e.g., using an ECC encoder after the third shaping function).

At 460, the memory system controller 410 may store, at a third time subsequent to the first time and the second time, the sixth set of bits in the multiple-level memory cells based on generating the sixth set of bits. For example, the memory system controller 410 may store the sixth set of bits in respective ones of the multiple-level memory cells (e.g., a wordline of the multiple-level memory cells).

At 465, the memory system controller 410 may receive (e.g., from the host system 405), a seventh set of bits associated with a fourth logical page of memory cells. The seventh set of bits may be for storing in the one or more multiple-level memory cells of the memory device 415.

At 470, the memory system controller 410 may generate, using a fourth shaping function, an eighth set of bits associated with the seventh set of bits as well as the second set of bits, the fourth set of bits, the sixth set of bits, or any combination thereof based on receiving the seventh set of bits. In some cases, the fourth shaping function may generate the eighth set of bits based on the second set of bits, the first flipping flag, the second flipping flag, the fourth set of bits, a third flipping flag that is output from the third shaping function, the sixth set of bits, the seventh set of bits, and a fourth cost vector associated with the fourth logical page of memory cells. That is, the memory system controller 410 may use the shaped second set of bits, the shaped fourth set of bits, the shaped sixth set of bits, or any combination thereof as inputs to the fourth shaping function (e.g., which may improve a decision of the fourth shaping function).

In some cases, the fourth cost vector may be calculated based on an inner product between a level histogram and a total cost vector. In some cases, the memory system controller 410 may scramble the seventh set of bits based on receiving the seventh set of bits, where the eighth set of bits may be generated based on the scrambled seventh set of bits (e.g., the scrambled bits may be input to the fourth shaping function). For example, the scrambled seventh set of bits may include bits that are uniformly distributed across the one or more logic states and the eighth set of bits may include bits that are non-uniformly distributed across the one or more logic states based on using the fourth shaping function. Additionally, or alternatively, the memory system controller 410 may encode the eighth set of bits (e.g., using an ECC encoder after the fourth shaping function).

At 475, the memory system controller 410 may store, at a fourth time subsequent to the first time, the second time, and the third time, the eighth set of bits in the multiple-level memory cells based on generating the eighth set of bits. For example, the memory system controller 410 may store the eighth set of bits in respective ones of the multiple-level memory cells (e.g., a wordline of the multiple-level memory cells).

At 480, the memory system controller 410 may read, from the memory device 415, data associated with the first logical page of memory cells, the second logical page of memory cells, the third logical page of memory cells, the fourth logical page of memory cells, or any combination thereof. As an example, the memory system controller 410 may read, from the multiple-level memory cells, the second set of bits and the fourth set of bits (e.g., associated with the first logical page and the second logical page, respectively).

At 485, the memory system controller 410 may unshape the data read from the memory device 415. For example, the memory system controller 410 may unshape the second set of bits and the fourth set of bits using respective unshaping functions based on reading the second set of bits and the fourth set of bits from the multiple-level memory cells. In some cases, unshaping the second set of bits may include generating, using a first unshaping function, a ninth set of bits based on the second set of bits and the first flipping flag (e.g., using an output of the first shaping function as an input to the first unshaping function). Additionally, unshaping the fourth set of bits may include generating, using a second unshaping function, a tenth set of bits based on the fourth set of bits and the second flipping flag (e.g., using an output of the second shaping function as an input to the second unshaping function). In some cases, the memory system controller 410 may decode (e.g., using respective ECC decoders) and descramble (e.g., using respective descramblers) the data as part of unshaping the data. The memory system controller 410 may perform similar techniques to unshape data associated with the third logical page of memory cells and the fourth logical page of memory cells (e.g., if the memory system controller 410 reads data associated with the third and fourth logical pages), which may include unshaping the sixth set of bits using a third unshaping function and unshaping the eighth set of bits using a fourth unshaping function.

At 490, the memory system controller 410 may transmit, to the host system 405 (e.g., a host device), the unshaped data read from the multiple-level memory cells. For example, the memory system controller 410 may transmit the ninth set of bits associated with the first logical page of memory cells and the tenth set of bits associated with the second logical page of memory cells to the host system 405. By leveraging previously shaped bits as inputs to a subsequent shaping function and staggering the transmission of the shaped bits to the memory device, bandwidth costs associated with transferring the shaped bits may be reduced and the overall throughput of the memory device may be improved.

Figure 5:
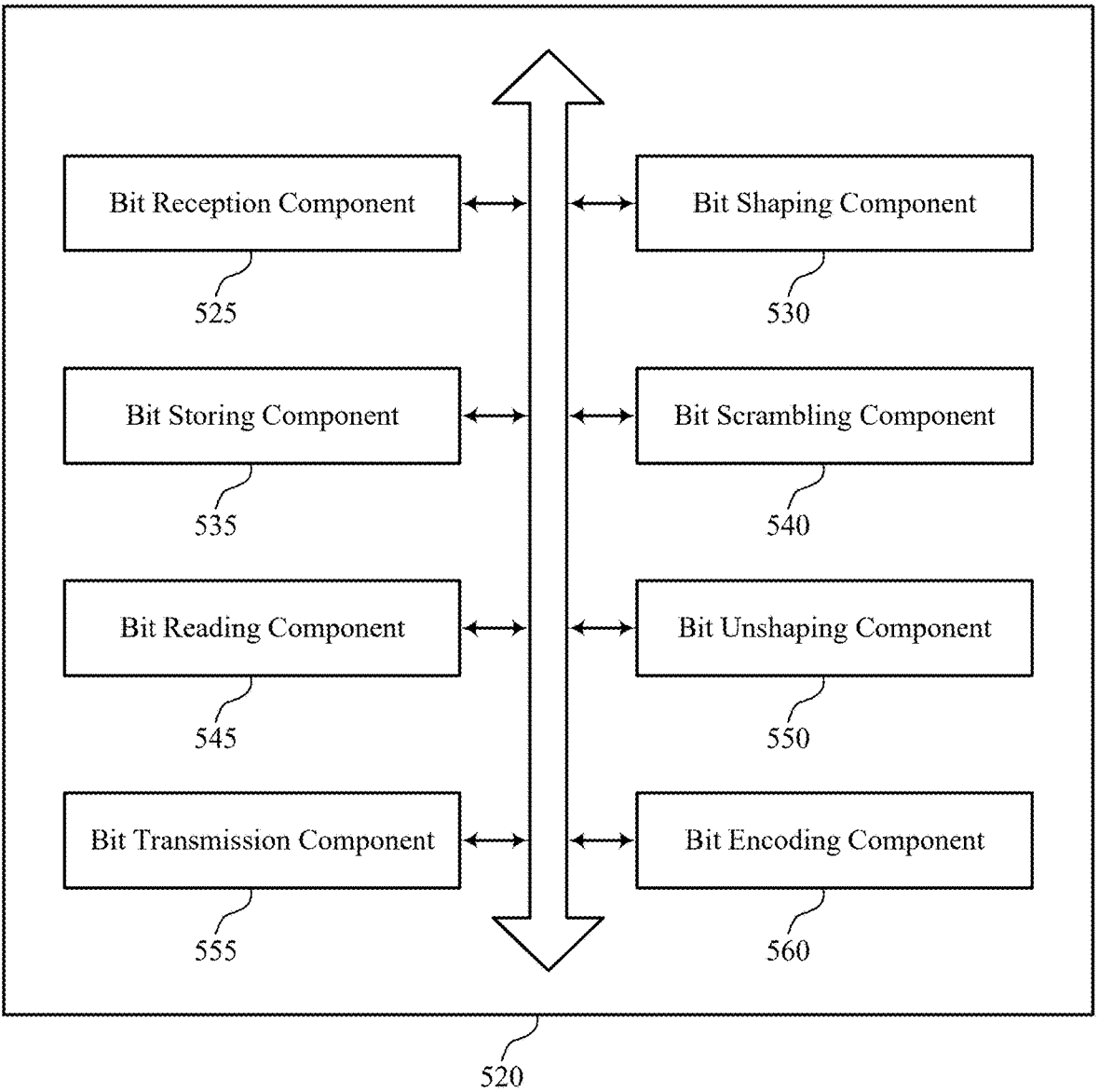
FIG. 5 shows a block diagram of a memory system that supports page-by-page level shaping in accordance with examples as disclosed herein.

FIG. 5 shows a block diagram 500 of a memory system 520 that supports page-by-page level shaping in accordance with examples as disclosed herein. The memory system 520 may be an example of aspects of a memory system as described with reference to FIGS. 1 through 4. The memory system 520, or various components thereof, may be an example of means for performing various aspects of page-by-page level shaping as described herein. For example, the memory system 520 may include a bit reception component 525, a bit shaping component 530, a bit storing component

535, a bit scrambling component 540, a bit reading component 545, a bit unshaping component 550, a bit transmission component 555, a bit encoding component 560, or any combination thereof. Each of these components, or components of subcomponents thereof (e.g., one or more processors, one or more memories), may communicate, directly or indirectly, with one another (e.g., via one or more buses).

The bit reception component 525 may be configured as or otherwise support a means for receiving, by a controller of a memory device, a first set of bits associated with a first logical page of memory cells, the first set of bits for storing in multiple-level memory cells of the memory device. The bit shaping component 530 may be configured as or otherwise support a means for generating, using a first shaping function, a second set of bits associated with the first set of bits based at least in part on receiving the first set of bits. In some examples, the bit reception component 525 may be configured as or otherwise support a means for receiving, by the controller, a third set of bits associated with a second logical page of memory cells, the third set of bits for storing in the multiple-level memory cells of the memory device. In some examples, the bit shaping component 530 may be configured as or otherwise support a means for generating, using a second shaping function, a fourth set of bits associated with the second set of bits and the third set of bits based at least in part on receiving the third set of bits. The bit storing component 535 may be configured as or otherwise support a means for storing the second set of bits and the fourth set of bits in the multiple-level memory cells of the memory device.

In some examples, the bit reception component 525 may be configured as or otherwise support a means for receiving, by the memory device, a fifth set of bits associated with a third logical page of memory cells, the fifth set of bits for storing in the multiple-level memory cells of the memory device. In some examples, the bit shaping component 530 may be configured as or otherwise support a means for generating, using a third shaping function, a sixth set of bits associated with the second set of bits, the fourth set of bits, and the fifth set of bits based at least in part on receiving the fifth set of bits. In some examples, the bit storing component 535 may be configured as or otherwise support a means for storing the fifth set of bits in the multiple-level memory cells.

In some examples, the bit reception component 525 may be configured as or otherwise support a means for receiving, by the memory device, a seventh set of bits associated with a fourth logical page of memory cells, the seventh set of bits for storing in the multiple-level memory cells of the memory device. In some examples, the bit shaping component 530 may be configured as or otherwise support a means for generating, using a fourth shaping function, an eighth set of bits associated with the second set of bits, the fourth set of bits, the sixth set of bits, and the seventh set of bits based at least in part on receiving the seventh set of bits. In some examples, the bit storing component 535 may be configured as or otherwise support a means for storing the seventh set of bits in the multiple-level memory cells.

In some examples, the second shaping function generates the fourth set of bits using the second set of bits generated by the first shaping function and the third set of bits received by the controller.

In some examples, to support storing the second set of bits and the fourth set of bits, the bit storing component 535 may be configured as or otherwise support a means for storing, at a first time, the second set of bits in the multiple-level memory cells based at least in part on generating the second set of bits. In some examples, to support storing the second set of bits and the fourth set of bits, the bit storing component 535 may be configured as or otherwise support a means for storing, at a second time, the fourth set of bits in the multiple-level memory cells based at least in part on generating the fourth set of bits.

In some examples, the first shaping function generates the second set of bits based at least in part on the first set of bits and a first cost vector associated with the first logical page of memory cells; and the second shaping function generates the fourth set of bits based at least in part on the second set of bits, a flipping flag that is output from the first shaping function, the third set of bits, and a second cost vector associated with the second logical page of memory cells.

In some examples, the first cost vector is calculated based at least in part on an inner product between a level histogram and a total cost vector.

In some examples, the bit scrambling component 540 may be configured as or otherwise support a means for scrambling, by the controller, the first set of bits based at least in part on receiving the first set of bits, where the second set of bits is generated based at least in part on the scrambled first set of bits. In some examples, the bit scrambling component 540 may be configured as or otherwise support a means for scrambling, by the controller, the third set of bits based at least in part on receiving the third set of bits, where the fourth set of bits is generated is based at least in part on the scrambled second set of bits.

In some examples, the scrambled first set of bits and the scrambled second of bits each include bits that are uniformly distributed across one or more logic states. In some examples, the second set of bits and the fourth set of bits each include bits that are non-uniformly distributed across the one or more logic states based at least in part on using respective shaping functions.

In some examples, the non-uniformly distributed bits are each mapped to one or more logic states of a plurality of logic states.

In some examples, the bit reading component 545 may be configured as or otherwise support a means for reading, from the multiple-level memory cells, the second set of bits and the fourth set of bits. In some examples, the bit unshaping component 550 may be configured as or otherwise support a means for unshaping the second set of bits and the fourth set of bits based at least in part on reading the second set of bits and the fourth set of bits from the multiple-level memory cells. In some examples, the bit transmission component 555 may be configured as or otherwise support a means for transmitting, to a host device, a ninth set of bits associated with the first logical page of memory cells and a tenth set of bits associated with the second logical page of memory cells based at least in part on unshaping the second set of bits and the fourth set of bits.

In some examples, to support unshaping the second set of bits and the fourth set of bits, the bit unshaping component 550 may be configured as or otherwise support a means for generating, using a first unshaping function, the ninth set of bits based at least in part on the second set of bits and a first flipping flag. In some examples, to support unshaping the second set of bits and the fourth set of bits, the bit unshaping component 550 may be configured as or otherwise support a means for generating, using a second unshaping function, the tenth set of bits based at least in part on the fourth set of bits and a second flipping flag.

In some examples, the bit encoding component 560 may be configured as or otherwise support a means for encoding the second set of bits and the fourth set of bits, where storing the second set of bits and the fourth set of bits to the multiple-level memory cells is based at least in part on encoding the second set of bits and the fourth set of bits.

In some examples, the multiple-level memory cells include multi-level memory cells, tri-level memory cells, or quad-level memory cells.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

FIG. 6 shows a flowchart illustrating a method 600 that supports page-by-page level shaping in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, by a controller of a memory device, a first set of bits associated with a first logical page of memory cells, the first set of bits for storing in multiple-level memory cells of the memory device. In some examples, aspects of the operations of 605 may be performed by a bit reception component 525 as described with reference to FIG. 5.

At 610, the method may include generating, using a first shaping function, a second set of bits associated with the first set of bits based at least in part on receiving the first set of bits. In some examples, aspects of the operations of 610 may be performed by a bit shaping component 530 as described with reference to FIG. 5.

At 615, the method may include receiving, by the controller, a third set of bits associated with a second logical page of memory cells, the third set of bits for storing in the multiple-level memory cells of the memory device. In some examples, aspects of the operations of 615 may be performed by a bit reception component 525 as described with reference to FIG. 5.

At 620, the method may include generating, using a second shaping function, a fourth set of bits associated with the second set of bits and the third set of bits based at least in part on receiving the third set of bits. In some examples, aspects of the operations of 620 may be performed by a bit shaping component 530 as described with reference to FIG. 5.

At 625, the method may include storing the second set of bits and the fourth set of bits in the multiple-level memory cells of the memory device. In some examples, aspects of the operations of 625 may be performed by a bit storing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a controller of a memory device, a first set of bits associated with a first logical page of memory cells, the first set of bits for storing in multiple-level memory cells of the memory device; generating, using a first shaping function, a second set of bits associated with the first set of bits based at least in part on receiving the first set of bits; receiving, by the controller, a third set of bits associated with a second logical page of memory cells, the third set of bits for storing in the multiple-level memory cells of the memory device; generating, using a second shaping function, a fourth set of bits associated with the second set of bits and the third set of bits based at least in part on receiving the third set of bits; and storing the second set of bits and the fourth set of bits in the multiple-level memory cells of the memory device.

Aspect 2: The method, apparatus, or non-transitory computer-readable medium of aspect 1, further including operations, features, circuitry, logic, means, or instructions, or any combination thereof for receiving, by the memory device, a fifth set of bits associated with a third logical page of memory cells, the fifth set of bits for storing in the multiple-level memory cells of the memory device; generating, using a third shaping function, a sixth set of bits associated with the second set of bits, the fourth set of bits, and the fifth set of bits based at least in part on receiving the fifth set of bits; and storing the fifth set of bits in the multiple-level memory cells.

Aspect 3: The method, apparatus, or non-transitory computer-readable medium of aspect 2, further including operations, features, circuitry, logic, means, or instructions, or any combination thereof for receiving, by the memory device, a seventh set of bits associated with a fourth logical page of memory cells, the seventh set of bits for storing in the multiple-level memory cells of the memory device; generating, using a fourth shaping function, an eighth set of bits associated with the second set of bits, the fourth set of bits, the sixth set of bits, and the seventh set of bits based at least in part on receiving the seventh set of bits; and storing the seventh set of bits in the multiple-level memory cells.

Aspect 4: The method, apparatus, or non-transitory computer-readable medium of any of aspects 1 through 3, where the second shaping function generates the fourth set of bits using the second set of bits generated by the first shaping function and the third set of bits received by the controller.

Aspect 5: The method, apparatus, or non-transitory computer-readable medium of any of aspects 1 through 4, where storing the second set of bits and the fourth set of bits includes operations, features, circuitry, logic, means, or instructions, or any combination thereof for storing, at a first time, the second set of bits in the multiple-level memory cells based at least in part on generating the second set of bits and storing, at a second time, the fourth set of bits in the multiple-level memory cells based at least in part on generating the fourth set of bits.

Aspect 6: The method, apparatus, or non-transitory computer-readable medium of any of aspects 1 through 5, where the first shaping function generates the second set of bits based at least in part on the first set of bits and a first cost vector associated with the first logical page of memory cells; and the second shaping function generates the fourth set of bits based at least in part on the second set of bits, a flipping flag that is output from the first shaping function, the third set of bits, and a second cost vector associated with the second logical page of memory cells.

Aspect 7: The method, apparatus, or non-transitory computer-readable medium of aspect 6, where the first cost vector is calculated based at least in part on an inner product between a level histogram and a total cost vector.

Aspect 8: The method, apparatus, or non-transitory computer-readable medium of any of aspects 1 through 7, further including operations, features, circuitry, logic, means, or instructions, or any combination thereof for scrambling, by the controller, the first set of bits based at least in part on receiving the first set of bits, where the second set of bits is generated based at least in part on the scrambled first set of bits and scrambling, by the controller, the third set of bits based at least in part on receiving the third set of bits, where the fourth set of bits is generated is based at least in part on the scrambled second set of bits.

Aspect 9: The method, apparatus, or non-transitory computer-readable medium of aspect 8, where the scrambled first set of bits and the scrambled second of bits each include bits that are uniformly distributed across one or more logic states and the second set of bits and the fourth set of bits each include bits that are non-uniformly distributed across the one or more logic states based at least in part on using respective shaping functions.

Aspect 10: The method, apparatus, or non-transitory computer-readable medium of aspect 9, where the non-uniformly distributed bits are each mapped to one or more logic states of a plurality of logic states.

Aspect 11: The method, apparatus, or non-transitory computer-readable medium of any of aspects 1 through 10, further including operations, features, circuitry, logic, means, or instructions, or any combination thereof for reading, from the multiple-level memory cells, the second set of bits and the fourth set of bits; unshaping the second set of bits and the fourth set of bits based at least in part on reading the second set of bits and the fourth set of bits from the multiple-level memory cells; and transmitting, to a host device, a ninth set of bits associated with the first logical page of memory cells and a tenth set of bits associated with the second logical page of memory cells based at least in part on unshaping the second set of bits and the fourth set of bits.

Aspect 12: The method, apparatus, or non-transitory computer-readable medium of aspect 11, where unshaping the second set of bits and the fourth set of bits includes operations, features, circuitry, logic, means, or instructions, or any combination thereof for generating, using a first unshaping function, the ninth set of bits based at least in part on the second set of bits and a first flipping flag and generating, using a second unshaping function, the tenth set of bits based at least in part on the fourth set of bits and a second flipping flag.

Aspect 13: The method, apparatus, or non-transitory computer-readable medium of any of aspects 1 through 12, further including operations, features, circuitry, logic, means, or instructions, or any combination thereof for encoding the second set of bits and the fourth set of bits, where storing the second set of bits and the fourth set of bits to the multiple-level memory cells is based at least in part on encoding the second set of bits and the fourth set of bits.

Aspect 14: The method, apparatus, or non-transitory computer-readable medium of any of aspects 1 through 13, where the multiple-level memory cells include multi-level memory cells, tri-level memory cells, or quad-level memory cells.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: An apparatus, including: a memory device including multiple-level memory cells configured to information; and a controller coupled with the memory device and including: first circuitry configured to receive a first set of bits associated with a first logical page of memory cells, the first set of bits for storing in the multiple-level memory cells, where the first circuitry is configured to generate, using a first shaping function, a second set of bits associated with the first set of bits; and second circuitry configured to receive a third set of bits associated with a second logical page of memory cells, the third set of bits for storing in the multiple-level memory cells, where the second circuitry is configured to generate, using a second shaping function, a fourth set of bits associated with the third set of bits based at least in part on the second set of bits.

Aspect 16: The apparatus of aspect 15, where the controller further includes: third circuitry configured to receive a fifth set of bits associated with a third logical page of memory cells, the fifth set of bits for storing in the multiple-level memory cells, where the third circuitry is configured to generate, using a third shaping function, a sixth set of bits associated with the fifth set of bits based at least in part on the second set of bits and the fourth set of bits.

Aspect 17: The apparatus of aspect 16, where the controller further includes: fourth circuitry configured to receive a seventh set of bits associated with a fourth logical page of memory cells, the seventh set of bits for storing in the multiple-level memory cells, where the fourth circuitry is configured to generate, using a fourth shaping function, an eight set of bits associated with the seventh set of bits based at least in part on the second set of bits, the fourth set of bits, and the sixth set of bits.

Aspect 18: The apparatus of any of aspects 15 through 17, where: the first shaping function generates the second set of bits based at least in part on the first set of bits and a first cost vector associated with the first logical page of memory cells; and the second shaping function generates the fourth set of bits based at least in part on second set of bits, a flipping flag that is output from the first shaping function, the third set of bits, and a second cost vector associated with the second logical page of memory cells.

Aspect 19: The apparatus of aspect 18, where the first cost vector is calculated based at least in part on an inner product between a level histogram and a total cost vector.

Aspect 20: The apparatus of any of aspects 15 through 19, where the memory device further includes: a first encoder configured to encode to the second set of bits; and a second encoder configured to encode the fourth set of bits, where the multiple-level memory cells are configured to store the encoded second set of bits and the encoded fourth set of bits.

Aspect 21: The apparatus of aspect 20, where an output of the first encoder is coupled with an input of the second circuitry.

Aspect 22: The apparatus of any of aspects 15 through 21, where the controller further includes: a first scrambler coupled with the first circuitry and configured to scramble the first set of bits, where the second set of bits is generated based at least in part on the scrambled first set of bits; and a second scrambler coupled with the second circuitry and configured to scramble the third set of bits, where the fourth set of bits is generated based at least in part on the scrambled third set of bits.

Aspect 23: The apparatus of any of aspects 15 through 22, where the controller further includes: fifth circuitry configured to unshape the second set of bits and the fourth set of bits based at least in part on reading the second set of bits and the fourth set of bits from the multiple-level memory cells.

Aspect 24: The apparatus of aspect 23, where the fifth circuitry is configured to: generate, using a using a first unshaping function, a ninth set of bits associated with the first logical page of memory cells based at least in part on the second set of bits and a first flipping flag; and generate, using a second unshaping function, a tenth set of bits associated with the second logical page of memory cells based at least in part on the fourth set of bits and a second flipping flag.

Aspect 25: The apparatus of any of aspects 15 through 24, where the multiple-level memory cells includes multi-level memory cells, tri-level memory cells, or quad-level memory cells.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving, by a controller of a memory system, a first set of bits associated with a first logical page of memory cells, the first set of bits for storing in multiple-level memory cells of the memory system;
generating, using a first shaping function, a second set of bits associated with the first set of bits based at least in part on receiving the first set of bits;
receiving, by the controller, a third set of bits associated with a second logical page of memory cells, the third set of bits for storing in the multiple-level memory cells of the memory system;
generating, using a second shaping function, a fourth set of bits associated with the second set of bits and the third set of bits based at least in part on receiving the third set of bits; and
storing the second set of bits and the fourth set of bits in the multiple-level memory cells of the memory system, wherein a first multiple-level memory cell of the memory system stores one bit of the second set of bits and one bit of the fourth set of bits.

2. The method of claim 1, further comprising:
receiving, by the controller, a fifth set of bits associated with a third logical page of memory cells, the fifth set of bits for storing in the multiple-level memory cells of the memory system;
generating, using a third shaping function, a sixth set of bits associated with the second set of bits, the fourth set of bits, and the fifth set of bits based at least in part on receiving the fifth set of bits; and
storing the fifth set of bits in the multiple-level memory cells.

3. The method of claim 2, further comprising:
receiving, by the controller, a seventh set of bits associated with a fourth logical page of memory cells, the seventh set of bits for storing in the multiple-level memory cells of the memory system;
generating, using a fourth shaping function, an eighth set of bits associated with the second set of bits, the fourth set of bits, the sixth set of bits, and the seventh set of bits based at least in part on receiving the seventh set of bits; and
storing the seventh set of bits in the multiple-level memory cells.

4. The method of claim 1, wherein the second shaping function generates the fourth set of bits using the second set of bits generated by the first shaping function and the third set of bits received by the controller.

5. The method of claim 1, wherein storing the second set of bits and the fourth set of bits comprises:
    storing, at a first time, the second set of bits in the multiple-level memory cells based at least in part on generating the second set of bits; and
    storing, at a second time, the fourth set of bits in the multiple-level memory cells based at least in part on generating the fourth set of bits.

6. The method of claim 1, wherein:
    the first shaping function generates the second set of bits based at least in part on the first set of bits and a first cost vector associated with the first logical page of memory cells; and
    the second shaping function generates the fourth set of bits based at least in part on the second set of bits, a flipping flag that is output from the first shaping function, the third set of bits, and a second cost vector associated with the second logical page of memory cells.

7. The method of claim 6, further comprising:
    calculating the flipping flag based at least in part on an inner product between a level histogram and the first cost vector.

8. The method of claim 7, wherein calculating the flipping flag further comprises:
    identifying a first inner product between a first level histogram and the first cost vector, the first level histogram associated with a first value of the flipping flag;
    identifying a second inner product between a second level histogram and the first cost vector, the second level histogram associated with a second value of the flipping flag; and
    determining the flipping flag based at least in part on a minimum value between the first inner product and the second inner product.

9. The method of claim 7, wherein the flipping flag is calculated by recomputing the level histogram or swapping coordinates within the level histogram or the first cost vector.

10. The method of claim 1, further comprising:
    scrambling, by the controller, the first set of bits based at least in part on receiving the first set of bits, wherein the second set of bits is generated based at least in part on the scrambled first set of bits; and
    scrambling, by the controller, the third set of bits based at least in part on receiving the third set of bits, wherein the fourth set of bits is generated is based at least in part on the scrambled second set of bits.

11. The method of claim 10, wherein:
    the scrambled first set of bits and the scrambled second set of bits each comprise bits that are uniformly distributed across one or more logic states such that each logic state of the one or more logic states has an equal occurrence probability, and
    the second set of bits and the fourth set of bits each comprise bits that are non-uniformly distributed across the one or more logic states such that a first logic state of the one or more logic states has a first occurrence probability that is different from a second logic state of the one or more logic states based at least in part on using respective shaping functions.

12. The method of claim 11, wherein the bits that are non-uniformly distributed are each mapped to one or more logic states of a plurality of logic states.

13. The method of claim 1, further comprising:
    reading, from the multiple-level memory cells, the second set of bits and the fourth set of bits;
    unshaping the second set of bits and the fourth set of bits based at least in part on reading the second set of bits and the fourth set of bits from the multiple-level memory cells; and
    transmitting, to a host device, a ninth set of bits associated with the first logical page of memory cells and a tenth set of bits associated with the second logical page of memory cells based at least in part on unshaping the second set of bits and the fourth set of bits.

14. The method of claim 13, wherein unshaping the second set of bits and the fourth set of bits comprises:
    generating, using a first unshaping function, the ninth set of bits based at least in part on the second set of bits and a first flipping flag; and
    generating, using a second unshaping function, the tenth set of bits based at least in part on the fourth set of bits and a second flipping flag.

15. The method of claim 1, further comprising:
    encoding the second set of bits and the fourth set of bits, wherein storing the second set of bits and the fourth set of bits to the multiple-level memory cells is based at least in part on encoding the second set of bits and the fourth set of bits.

16. The method of claim 1, wherein the multiple-level memory cells comprise multi-level memory cells, tri-level memory cells, or quad-level memory cells.

17. A memory system, comprising:
    one or more memory devices comprising multiple-level memory cells configured to store information; and
    a controller coupled with the one or more memory devices and comprising:
        first circuitry configured to receive a first set of bits associated with a first logical page of memory cells, the first set of bits for storing in the multiple-level memory cells, wherein the first circuitry is configured to generate, using a first shaping function, a second set of bits associated with the first set of bits; and
        second circuitry configured to receive a third set of bits associated with a second logical page of memory cells, the third set of bits for storing in the multiple-level memory cells, wherein the second circuitry is configured to generate, using a second shaping function, a fourth set of bits associated with the third set of bits based at least in part on the second set of bits, wherein,
    the multiple-level memory cells are configured to store the second set of bits and the fourth set of bits, wherein a first multiple-level memory cell of the memory system stores one bit of the second set of bits and one bit of the fourth set of bits.

18. The memory system of claim 17, wherein the controller further comprises:
    third circuitry configured to receive a fifth set of bits associated with a third logical page of memory cells, the fifth set of bits for storing in the multiple-level memory cells, wherein the third circuitry is configured to generate, using a third shaping function, a sixth set of bits associated with the fifth set of bits based at least in part on the second set of bits and the fourth set of bits.

19. The memory system of claim 18, wherein the controller further comprises:

fourth circuitry configured to receive a seventh set of bits associated with a fourth logical page of memory cells, the seventh set of bits for storing in the multiple-level memory cells, wherein the fourth circuitry is configured to generate, using a fourth shaping function, an eight set of bits associated with the seventh set of bits based at least in part on the second set of bits, the fourth set of bits, and the sixth set of bits.

20. The memory system of claim 17, wherein: the first shaping function generates the second set of bits based at least in part on the first set of bits and a first cost vector associated with the first logical page of memory cells; and the second shaping function generates the fourth set of bits based at least in part on the second set of bits, a flipping flag that is output from the first shaping function, the third set of bits, and a second cost vector associated with the second logical page of memory cells.

21. The memory system of claim 17, wherein the controller further comprises:

a first encoder configured to encode to the second set of bits; and a second encoder configured to encode the fourth set of bits, wherein the multiple-level memory cells are configured to store the encoded second set of bits and the encoded fourth set of bits.

22. The memory system of claim 17, wherein the controller further comprises:

a first scrambler coupled with the first circuitry and configured to scramble the first set of bits, wherein the second set of bits is generated based at least in part on the scrambled first set of bits; and a second scrambler coupled with the second circuitry and configured to scramble the third set of bits, wherein the fourth set of bits is generated based at least in part on the scrambled third set of bits.

23. The memory system of claim 17, wherein the controller further comprises:

fifth circuitry configured to unshape the second set of bits and the fourth set of bits based at least in part on reading the second set of bits and the fourth set of bits from the multiple-level memory cells.

24. The memory system of claim 17, wherein the multiple-level memory cells comprises multi-level memory cells, tri-level memory cells, or quad-level memory cells.

25. A non-transitory computer-readable medium storing code comprising instructions which, when executed by a processor of a memory system, cause the memory system to:

receive, by a controller of the memory system, a first set of bits associated with a first logical page of memory cells, the first set of bits for storing in multiple-level memory cells of the memory system;

generate, using a first shaping function, a second set of bits associated with the first set of bits based at least in part on receiving the first set of bits;

receive, by the controller, a third set of bits associated with a second logical page of memory cells, the third set of bits for storing in the multiple-level memory cells of the memory system;

generate, using a second shaping function, a fourth set of bits associated with the second set of bits and the third set of bits based at least in part on receiving the third set of bits; and store the second set of bits and the fourth set of bits in the multiple-level memory cells of the memory system, wherein a first multiple-level memory cell of the memory system stores one bit of the second set of bits and one bit of the fourth set of bits.

* * * * *